United States Patent
Godfroid

(10) Patent No.: US 11,433,988 B2
(45) Date of Patent: Sep. 6, 2022

(54) AIRCRAFT WING COMPRISING A MOBILE LEADING EDGE FLAP GUIDED BY A DEVICE LOCATED AT THE FRONT OF A WING BOX

(71) Applicant: SONACA S.A., Gosselies (BE)

(72) Inventor: Xavier Godfroid, Mont Saint Guibert (BE)

(73) Assignee: SONACA S.A., Gosselies (BE)

( * ) Notice: Subject to any disclaimer, the term of this patent is extended or adjusted under 35 U.S.C. 154(b) by 113 days.

(21) Appl. No.: 17/057,948

(22) PCT Filed: May 24, 2019

(86) PCT No.: PCT/EP2019/063430
§ 371 (c)(1),
(2) Date: Nov. 23, 2020

(87) PCT Pub. No.: WO2019/228917
PCT Pub. Date: Dec. 5, 2019

(65) Prior Publication Data
US 2021/0206473 A1  Jul. 8, 2021

(30) Foreign Application Priority Data
May 29, 2018  (BE) .................................. 2018/5348

(51) Int. Cl.
*B64C 9/22*  (2006.01)
*B64C 3/18*  (2006.01)
*B64C 9/02*  (2006.01)

(52) U.S. Cl.
CPC ................ *B64C 9/22* (2013.01); *B64C 3/185* (2013.01); *B64C 9/02* (2013.01)

(58) Field of Classification Search
CPC .... B64C 9/22; B64C 9/02; B64C 7/00; B64C 3/50; B64C 5/10; B64C 9/24; B64C 9/26
See application file for complete search history.

(56) References Cited

U.S. PATENT DOCUMENTS 6,010,097 A * 1/2000 Cox .......................... B64C 9/16
244/99.3
8,517,314 B2 * 8/2013 Kracke ..................... B64C 9/22
244/99.3
(Continued)

FOREIGN PATENT DOCUMENTS

| EP | 0818387 B1 | 9/2004 |
| EP | 1972547 A1 | 9/2008 |
| WO | 2013/000577 A2 | 1/2013 |

OTHER PUBLICATIONS

Search Report issued in Belgium Patent Application No. 201805348 dated Feb. 8, 2019.
(Continued)

*Primary Examiner* — Richard R. Green
*Assistant Examiner* — William L Gmoser
(74) *Attorney, Agent, or Firm* — Pearne & Gordon LLP

(57) ABSTRACT

An aircraft wing including a mobile leading edge flap associated with a guiding device arranged at the front of a front spar of a wing box, and including: —a pivoting member having one end connected to the spar by an articulated linkage; —a pivoting member connected to one end of the member by an articulated linkage, the end of this member being connected to the flap via an articulated linkage; —a guide rail receiving a tracking member supported by the member, the rail defining a path inscribed on the surface of an imaginary sphere, the centre of which corresponds to a point of convergence of the axes of the three linkages.

14 Claims, 7 Drawing Sheets

(56) References Cited

U.S. PATENT DOCUMENTS

2010/0193642 A1* 8/2010 Crepin .................... B64C 9/22
244/214
2011/0253832 A1 10/2011 Wildman et al.

OTHER PUBLICATIONS

International Search Report for Application No. PCT/EP2019/063430 dated Aug. 5, 2019.
Written Opinion for PCT/EP2019/063430 dated Aug. 5, 2019.

* cited by examiner

AIRCRAFT WING COMPRISING A MOBILE LEADING EDGE FLAP GUIDED BY A DEVICE LOCATED AT THE FRONT OF A WING BOX

This is the National Stage of PCT international application PCT/EP2019/063430, filed on May 24, 2019 entitled "AIRCRAFT WING COMPRISING A MOBILE LEADING EDGE FLAP GUIDED BY A DEVICE LOCATED AT THE FRONT OF A WING BOX", which claims the priority of Belgium Patent Application No. 201805348 filed May 29, 2018, both of which are incorporated herein by reference in their entirety.

TECHNICAL FIELD

The present invention relates to the field of aircraft wings, of the type comprising a wing fixed centre body carrying one or more mobile leading edge flaps, also called "Slats".

It is noted that the invention is applicable to any aircraft types, such as a flying wing, a fuselage tail-mounted engine airplane, a supersonic airplane, etc.

State of Prior Art

On aircrafts, each of both wings of the airfoil is generally fitted with high lift mobile flaps, mounted to the leading edge and to the trailing edge of the wing.

In a known manner, the flaps are extended for landing and take-off phases in order to increase low or medium speed lift. Furthermore, in a high speed cruising flight, the mobile flaps are retracted to limit the air resistance of the aircraft. Still in a known manner to those skilled in the art, moving and guiding each flap are performed using means housed in a wing fixed centre body, as is clear for example in document EP 0 818 387. These means enable each mobile leading edge flap to be moved and guided along a usually arc of circle shaped trajectory with respect to the wing fixed centre body, between a retracted position in which the flap substantially closely fits the fixed body, and an extended position in which this flap is moved forwardly. This arc of circle trajectory of the flap is the preferentially chosen solution when this flap is moved orthogonally to the chord direction of the wing. However, other movements can be observed when the flap is moved along a different direction from that of the chord, for example when it is to be moved in parallel to the flight direction.

More precisely, to enable the mobile flap to be rotatably guided, conventional solutions provide guiding rails integral with this flap, in an arc of circle shape corresponding to the trajectory of the moving flap. These rails fulfil a simple role of rotational guidance for the flap, and/or a driving function for the same. They cooperate with rollers carried by the wing fixed centre body, and also with means of the toothed wheels type for moving the driving rails.

Although this configuration is highly widespread on aircraft wings, it requires that the rails pass through the front spar of the wing box. The penetrating nature of the guiding rails and driving rails makes the wing box volume swept by these rails unusable. The unused volume could for example be used to store more fuel in the wing box, and thus increase aircraft endurance.

DISCLOSURE OF THE INVENTION

The purpose of the invention is therefore to at least partially overcome the abovementioned drawback, relating to prior art implementations.

To do so, one object of the invention is first an aircraft wing comprising a wing fixed centre body, as well as at least one mobile leading edge flap for being moved relative to said fixed centre body between an extended position and a retracted position, the wing fixed centre body comprising a front spar delimiting a wing box at the front of which said mobile flap is located, the latter being associated with at least one guiding device enabling it to be guided with respect to the wing fixed centre body.

According to the invention, the guiding device is totally arranged at the front of the front spar of the wing box, this device including the following elements:

a first pivoting member having a first end connected to the front spar of the wing box through a first hinged connection;

a second pivoting member connected to a second end of the first pivoting member through a second hinged connection arranged between a first and a second end of the second pivoting member, the first end of this second pivoting member being connected to a module for connecting the mobile flap through a third hinged connection; and a guiding rail integral with the front spar of the wing box, the guiding rail receiving a follower member arranged at the second end of the second pivoting member, the guiding rail defining a trajectory lying on the surface of a dummy sphere, and the hinging axes of the three hinged connections converge to a same point corresponding to the centre of the dummy sphere.

The invention provides a solution enabling the device for guiding the mobile flap to be restricted at the front of the wing, without any of its components having to pass through the front spar of the wing box. Advantageously, the volume of this box can thus be further functionalised, for example to store a higher fuel amount in the box.

To achieve this result, the solution provided by the invention drastically contrasts with prior implementations, since the design of the guiding device is now based on the use of pivoting members and hinged connections, the hinging axes of which all converge to a same point. By way of indicating example, when the motion of the flap with respect to the wing fixed centre body is a rotation or comprises a rotation, this point of convergence is on the axis of this rotation.

More generally, the solution provided by the invention enables to make the connecting module mobile at the surface of a sphere the centre of which is the point of convergence of the hinging axes, whereas the trajectory of this module is conditioned by that of the guiding rail. For example, the trajectory of the guiding rail can be configured such that the incident movement of the flap is performed in a movement plane parallel to a chord direction of the wing, or a flight direction of the aircraft.

The invention furthermore provides at least any of the following optional characteristics, taken alone or in combination.

The first and second pivoting members are arms.

The second hinged connection is arranged at a median zone of the second pivoting member.

The first hinged connection is made using one or more hinges.

The follower member is a roller system carried by the second end of the second pivoting member.

The guiding rail and the first hinged connection are spaced apart from each other along a span direction of the wing. This feature shows that the design of the guiding device is based on occupying the space along the span direction, rather than on the use of rail type elements extending along the chord direction of the wing.

The trajectory defined by the guiding rail requires a movement of the third hinged connection in a movement plane parallel to a chord direction of the wing, and the movement of the flap relative to the wing fixed centre body is a rotation along a rotational axis of the flap passing through the point of convergence of the hinging axes of the three hinged connections.

Alternatively, the trajectory defined by the guiding rail can require a movement of the third hinged connection in a movement plane parallel to a flight direction, this solution being preferentially chosen when the whole flap is intended to be moved parallel to the flight direction.

Other movements are however contemplatable, without departing from the scope of the invention.

The wing further includes, being associated with said mobile leading edge flap, at least one device for moving the mobile flap, the moving device being mounted to the wing fixed centre body.

The moving device has an outlet mounted to the mobile leading edge flap.

According to one alternative, the moving device has an outlet mounted to the first pivoting member or on the second pivoting member of the guiding device.

By way of example, the moving device is a cylinder.

The moving device is totally arranged at the front of the front spar of the wing box, by being preferably fastened to this front spar.

The wing preferably includes, being associated with said mobile leading edge flap, several moving devices as well as several guiding devices.

Finally, the object of the invention is also an aircraft comprising at least one wing such as described above, this same wing being preferentially fitted with several mobile leading edge flaps.

Further advantages and characteristics of the invention will appear in the non-limiting detail description below.

BRIEF DESCRIPTION OF THE DRAWINGS

This description will be made in relation to the appended drawings from which.

DETAILED DISCLOSURE OF PREFERRED EMBODIMENTS

Figure 1:
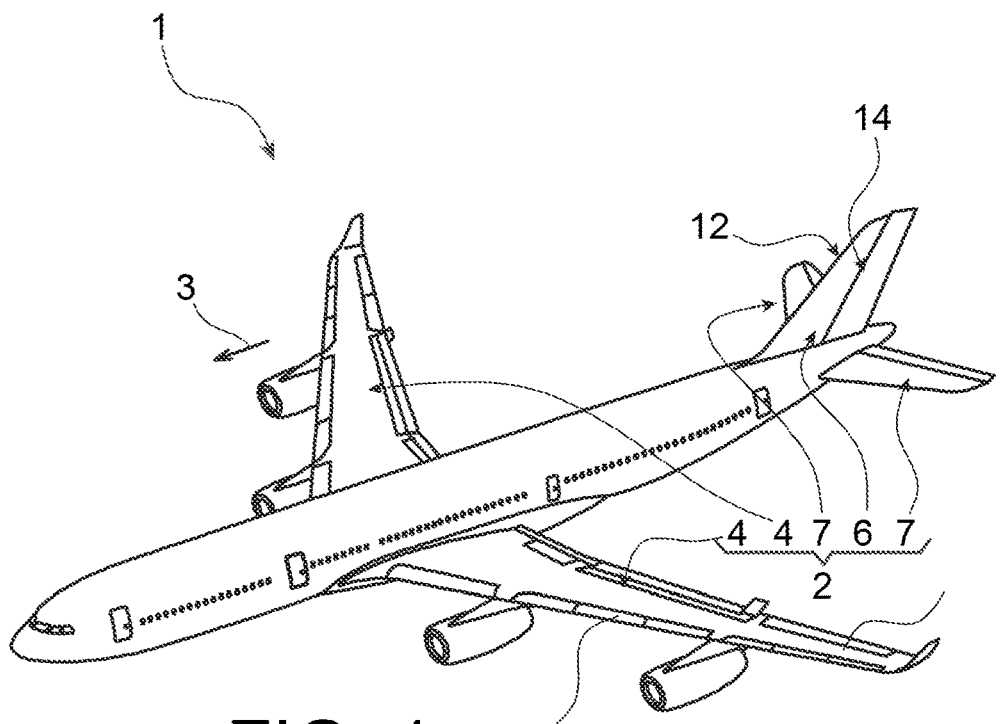
FIG. 1 represents a perspective view of an aircraft.

First with reference to FIG. 1, an aircraft 1 having an airfoil 2 consisting of a plurality of airfoil elements is represented.

Throughout the description that follows, the terms "front" and "rear" are to be considered with respect to a direction of advance of the aircraft experienced as a result of the thrust exerted by the aircraft engines, this direction being schematically represented by the arrow 3, and also called a "flight direction".

Among the airfoil elements of the aircraft 1, there are provided two main wings, called the wings 4, a vertical stabiliser 6, as well as two horizontal tails 7 located at the rear of this aircraft.

Regarding the wings 4, as discussed above, each of them comprise a wing fixed centre body 8, also called a main centre portion, this body being nearly the entire wing, and being located at the rear of a leading edge 10.

Figure 2:
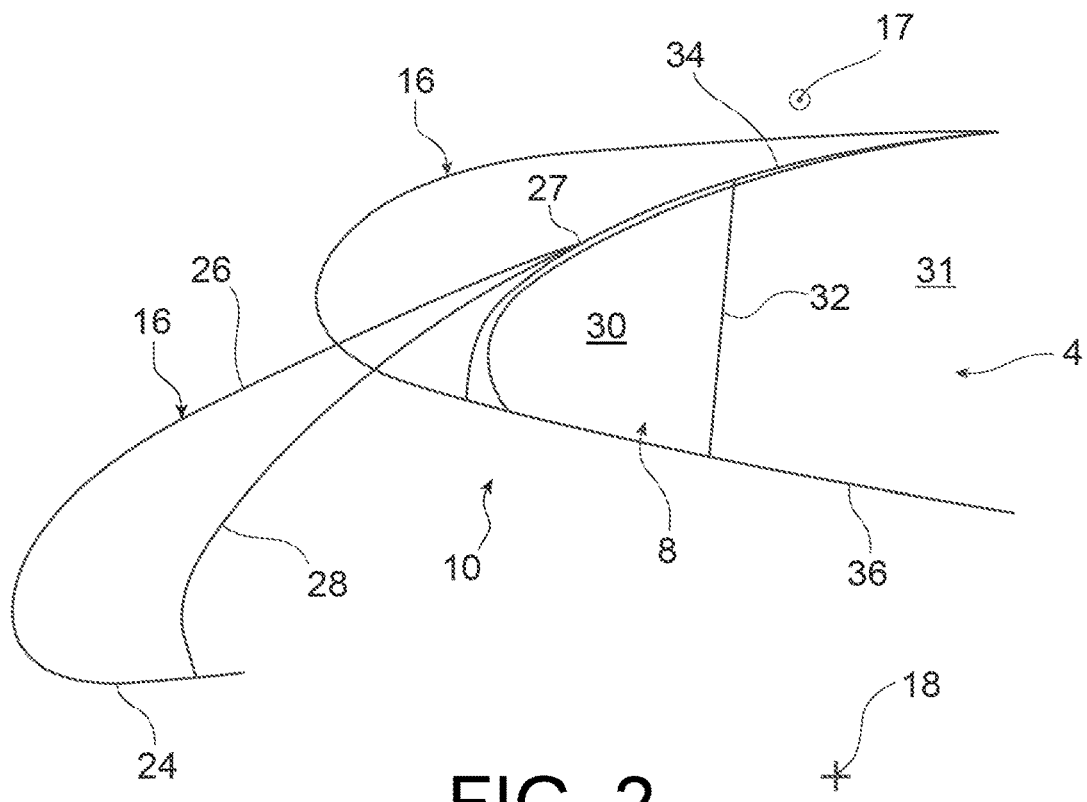
FIG. 2 represents a cross-section schematic partial view of an aircraft wing according to the present invention, fitted with a mobile leading edge flap.

As is schematically shown in FIG. 2, it is the leading edge 10 of each of both wings 4 which can be fitted with at least one mobile leading edge flap 16, also called "Slat". Each of these flaps 16 is to be connected to the body 8 by means which will be detailed hereinafter. In this FIG. 2, it is shown that the mobile leading edge flap 16 (schematically represented) can occupy a retracted/stowed position in which it is flush with the front part of the fixed centre body 8 of the wing 4. In such a case, the mobile flap 16 is in the rear most position. Moreover, the mobile flap 16 can occupy a fully extended position where it is at a distance forwardly from the fixed centre body 8, this fully extended position being assumed in particular during take-off and landing phases in order to increase low or medium speed lift. This flap 16 is of course designed to be moved between these two end positions, for example so as to make it assume an intermediate take-off position, known to those skilled in the art.

By way of indication, the mobile flap 16 for example extends substantially over the entire length of the wing 4 in question, of course along the span direction 17 of this wing 4, or only over just a portion of this wing, as is most common on aircrafts.

In a known manner, the flap 16 includes an aerodynamic coating defining a lower surface portion 24 as well as an upper surface portion 26, the latter ending with a trailing edge 27 of the flap. Moreover, it is closed rearwardly by a closing coating 28, for closely fitting the wing fixed body 8 when it occupies the retracted position.

This fixed body 8 has a front end space 30, located at the front of a wing box 31 and delimited rearwardly by a front spar 32 of this box. The front spar extends parallel to the span direction 17, substantially over the entire length of the wing. It thus forms the wing box 31 with an upper skin 34, a lower skin 36, and a rear spar not visible in FIG. 2. The wing box 31 conventionally provides a structural function to the wing, but it can also be at least partially filled with fuel.

In FIG. 2, the mobile flap 16 is represented in both its retracted and extended positions. The movement between these positions is carried out by one or more moving devices, whereas the trajectory of this movement is dictated by one or more guiding devices here enabling the flap 16 to be simply rotated, relative to the fixed centre body 8, along a rotational axis 18. More complex motions of the flap can be contemplated, for example motions including such a rotation, without departing from the scope of the invention. Nevertheless, as indicated above, the preferred embodiment which will be now described relates to a simple rotational motion of the flap between its two end positions, this motion being preferentially assumed when the flap is moved orthogonally to a chord direction of the wing.

Figure 3:
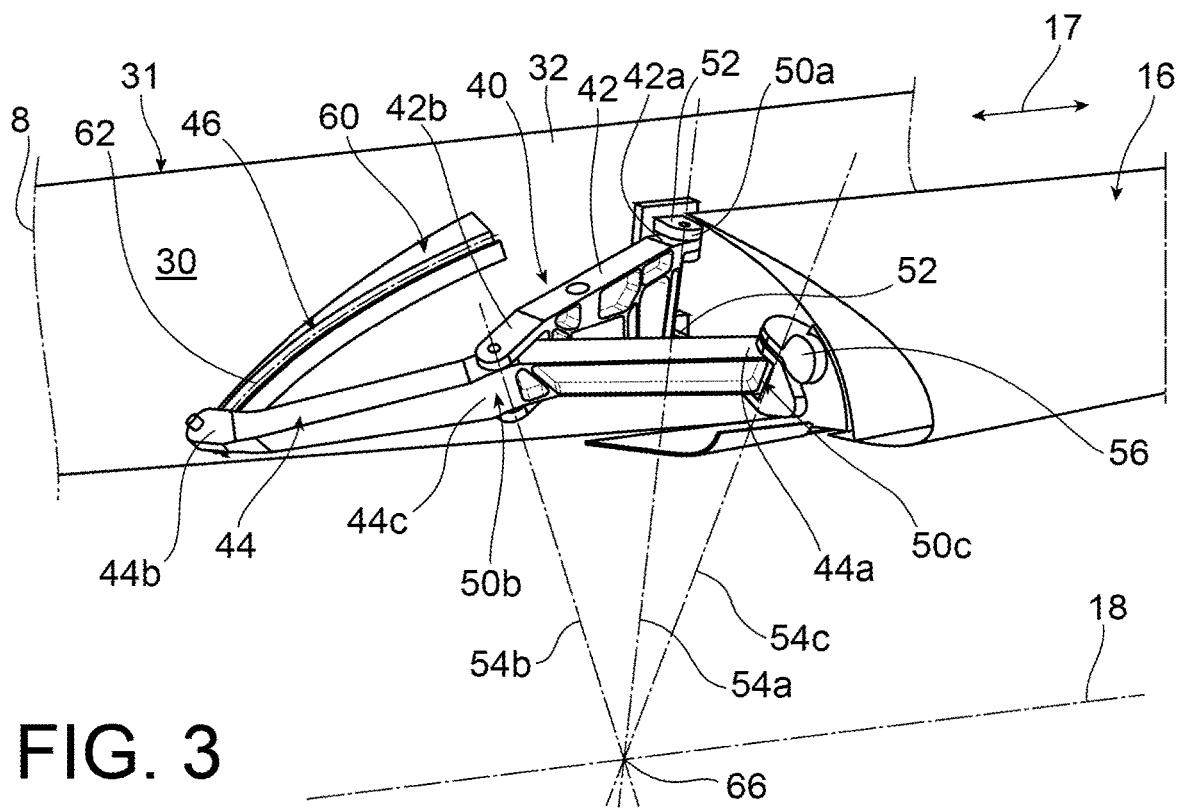
FIG. 3 represents a partial perspective view of the mobile leading edge flap shown in FIG. 2 and of its rotatable guiding device, the flap assuming a retracted position.

One of these guiding devices 40, enabling such a motion, which will be now described with reference to FIGS. 3 to 3c.

First, the guiding device 40 has the feature of being totally arranged at the front of the front spar 32, by remaining restricted in the front end space 30 of the fixed centre body 8 when the flap assumes its retracted position. No element of this device 40 therefore passes through the front spar 32 rearwardly, and whatever the position of the mobile flap 16. The volume of the wing box 31 can thus be optimised, since no element of the guiding device 40 penetrates therewithin.

The guiding device 40 essentially includes three elements, namely a first arm-shaped pivoting member 42, a second arm-shaped pivoting member 44, as well as a guiding rail 46.

More precisely, the first pivoting arm 42 has a first end 42a as well as a second end 42b opposite to the first one. The first end 42a is connected to a front face of the front spar 32 through a first hinged connection 50a, which is made using several hinges 52. This first hinged connection 50a defines a first hinging axis 54a along which the different hinges 52, here two of them, are succeeding each other. Fastening the base of the hinges 52 is performed conventionally on the front face of the front spar 32, for example using a clevis fastened by bolts or similar elements.

At its second clevis-shaped end 42b, the first pivoting arm 42 is connected to a median zone 44c of the second pivoting arm 44, through a second hinged connection 50b. The latter is even more preferentially located on or close to a centre of this arm 44. It defines a second hinging axis 54b passing through both clevis lugs.

The first arm 42 is preferably substantially planar, possibly recessed in some parts, thus revealing reinforcements.

The second pivoting arm 44 also has a first end 44a as well as a second end 44b opposite to the first one, these two ends being arranged on either side of the median zone 44c. The first end 44a is connected to a connecting module 56 of the flap 16. Here, the module is conventional, that is it is fastened to the structure of the flap 16. The module 56 can integrate, in a known manner, an eccentric system enabling the trailing edge position of the flap 16 to be adjusted. It also enables differential expansions of the flap 16 in the span direction to be corrected. Mounting the first end 44a on the connecting module 56 is performed through a third hinged connection 50c, defining a third hinging axis 54c. In other words, the connecting module 56 is here considered as being part of the third hinged connection, or as being integral with this same part of the connection.

The second arm 44 can have a more tapered shape than that of the first arm. It is not necessarily straight, but can have a bend of few degrees at the second connection 50b.

Figure 3A:
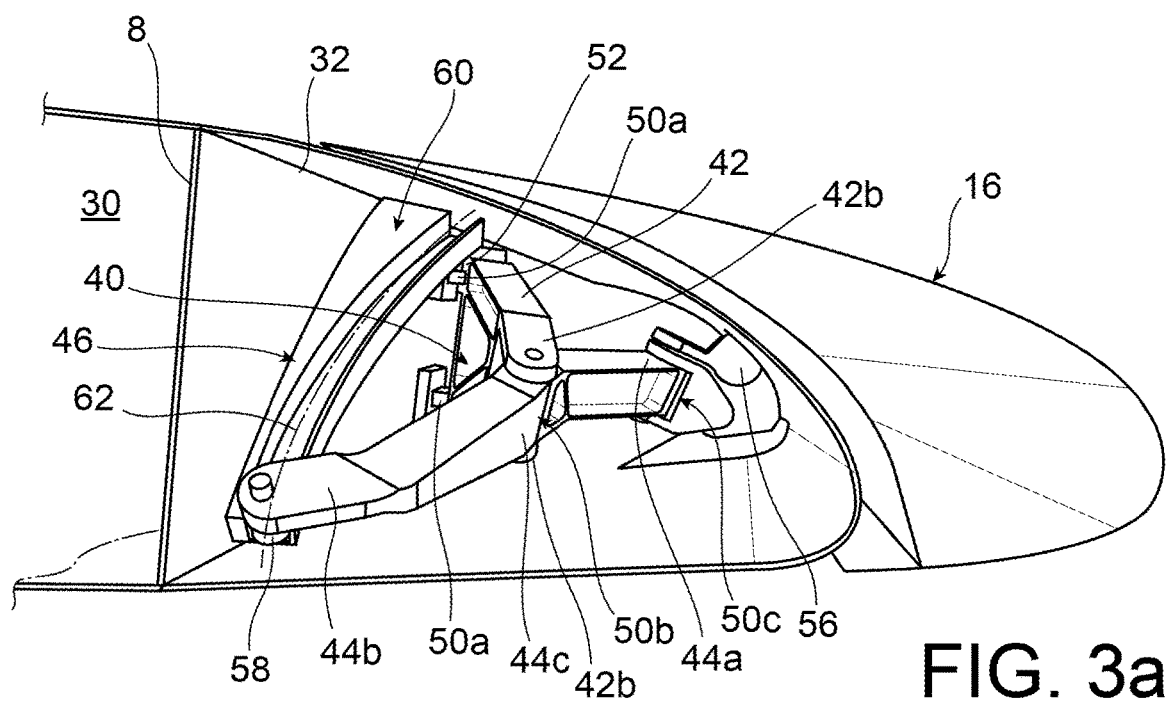
FIGS. 3a and 3b are perspective views similar to that of FIG. 3, along different viewing angles.

At its second end 44b, the second pivoting arm 44 carries a roller-shaped follower member 58, which is visible in FIG. 3a. This roller 58 is pivotably mounted along its own axis, at the end 44b of the second arm 44. It cooperates with the guiding rail 46, in which it is movably housed. Groove-shaped specific means (not represented) can be implemented to prohibit the roller 58 from exiting the rail.

Figure 3B:
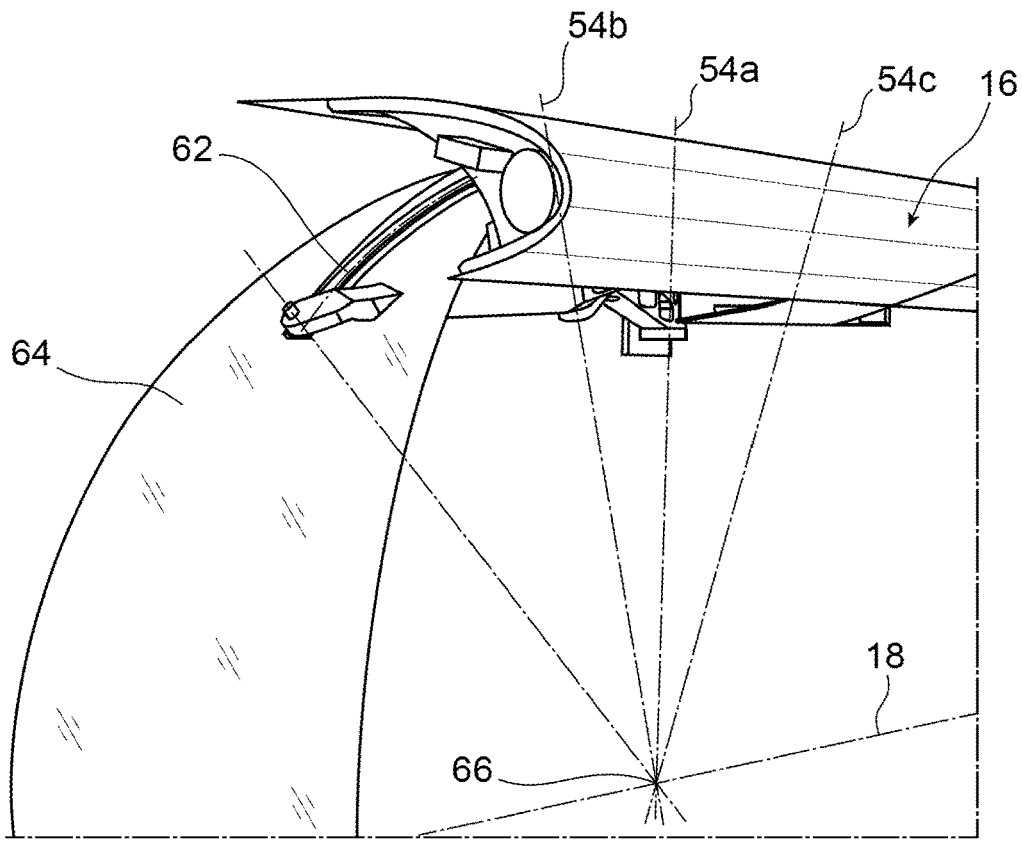
Figure 3C:
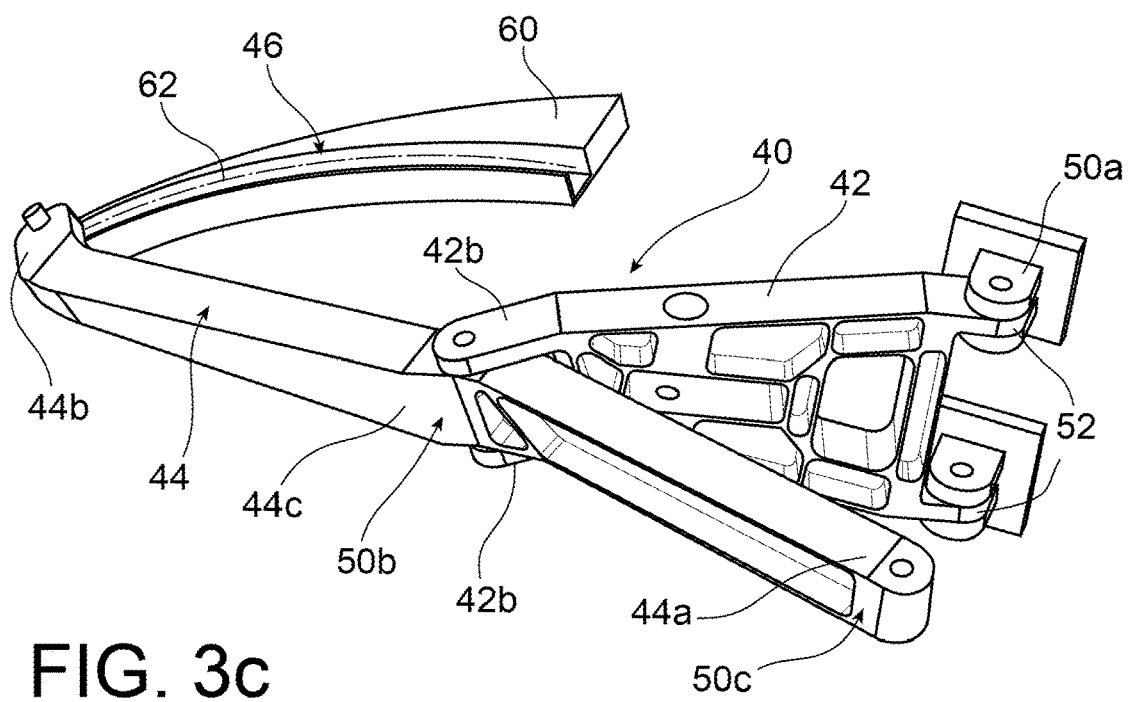
FIG. 3c represents a perspective view of the system for rotatably guiding the flap, shown in FIGS. 3 to 3b.

The guiding rail 46 is defined by a structure 60 fastened to the front face of the front spar 32, and spaced apart from the first connection 50a along the span direction 17. Here again, fastening the structure 60 is conventionally performed to the front face of the front spar 32, using for example a clevis fastened by bolts or similar elements. The guiding rail 46 defines a trajectory 62 for the roller 58, this trajectory overall extending along the front face of the front spar 32 of the wing box 31. More precisely, this trajectory 62 lies on the surface of a dummy sphere 64 depicted in FIG. 3b. This sphere 64 has a centre 66 at which the three hinging axes 54a, 54b, 54c converge. This point of convergence 66 is located on the rotational axis 18 of the mobile flap, so as to allow rotational movement thereof. This movement of the flap is therefore dependent on the trajectory 62 defined by the guiding rail 46, the shape of which can be an arc of circle, or more preferentially a more complex line still lying on the dummy sphere 64.

Figure 4:
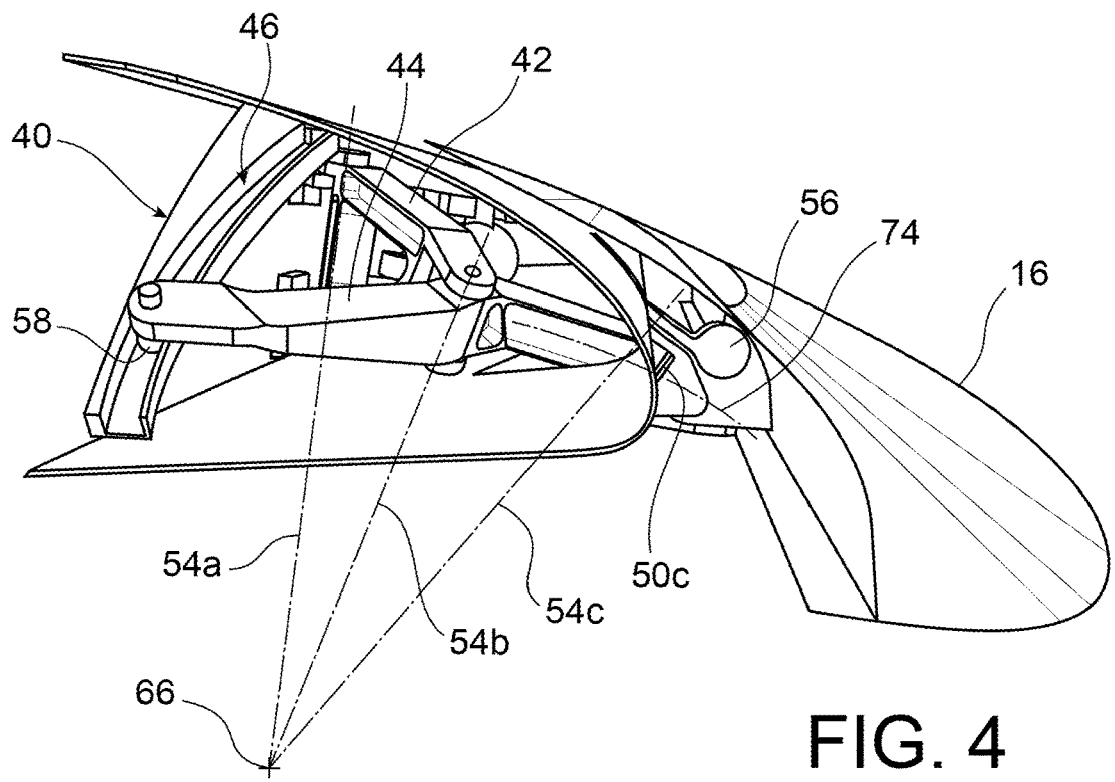
FIGS. 4 and 5 are perspective views similar to that of FIG. 3a, with the mobile flap being respectively represented in an intermediate position and in an extended position.
Figure 5:
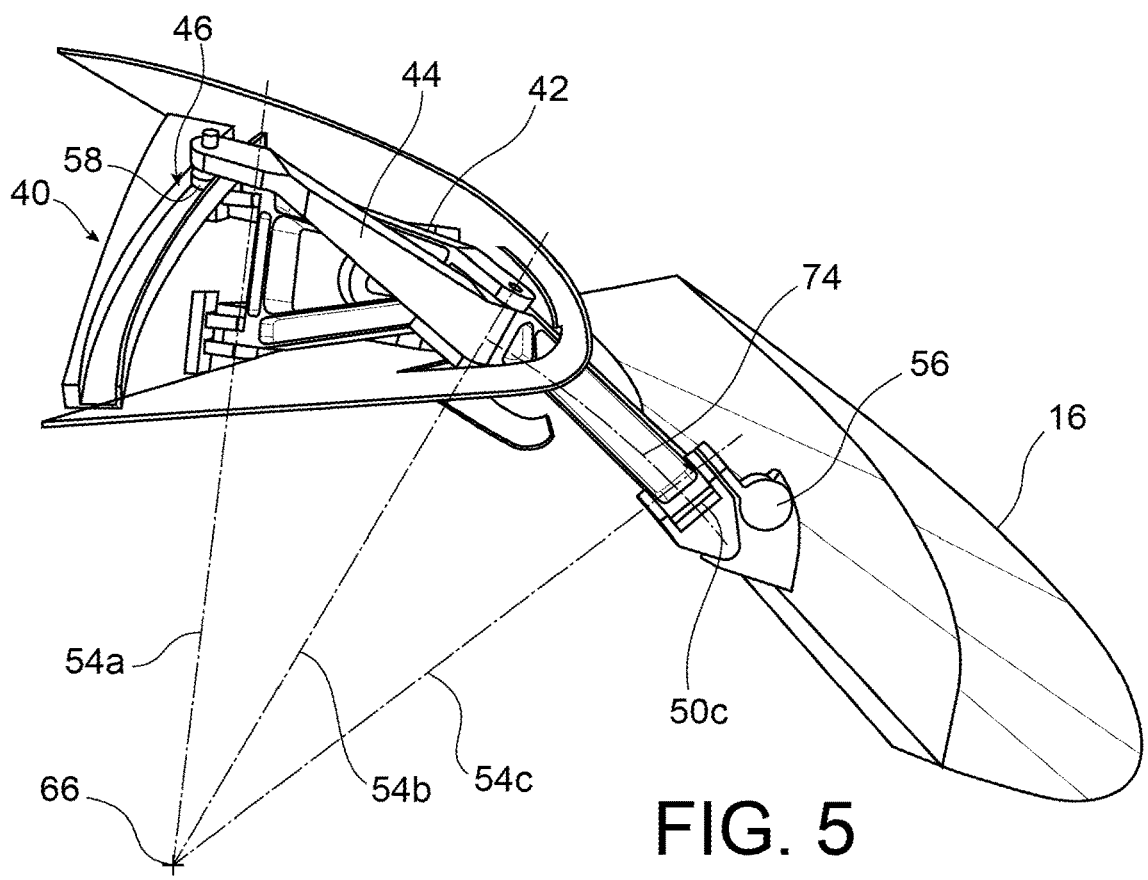
Figure 6:
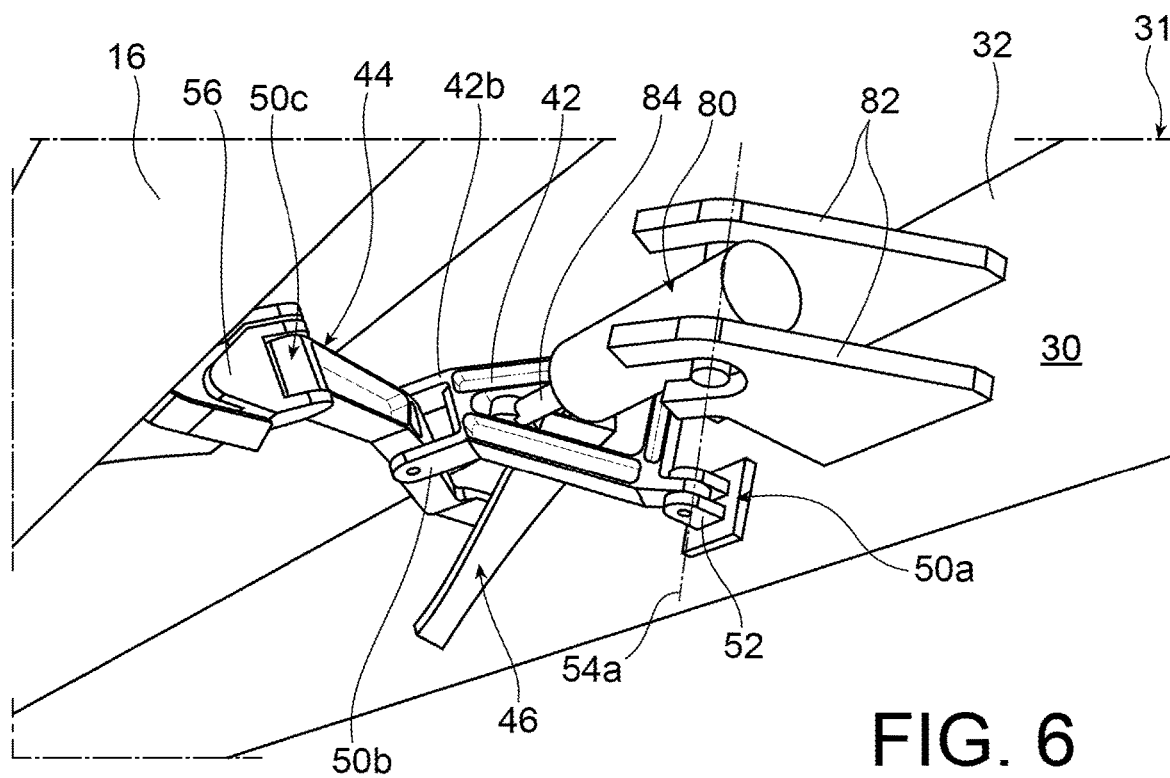
FIG. 6 represents a partial perspective view of the mobile leading edge flap, of its rotatable guiding device, and of its moving device coupled with the guiding device.
Figure 7:
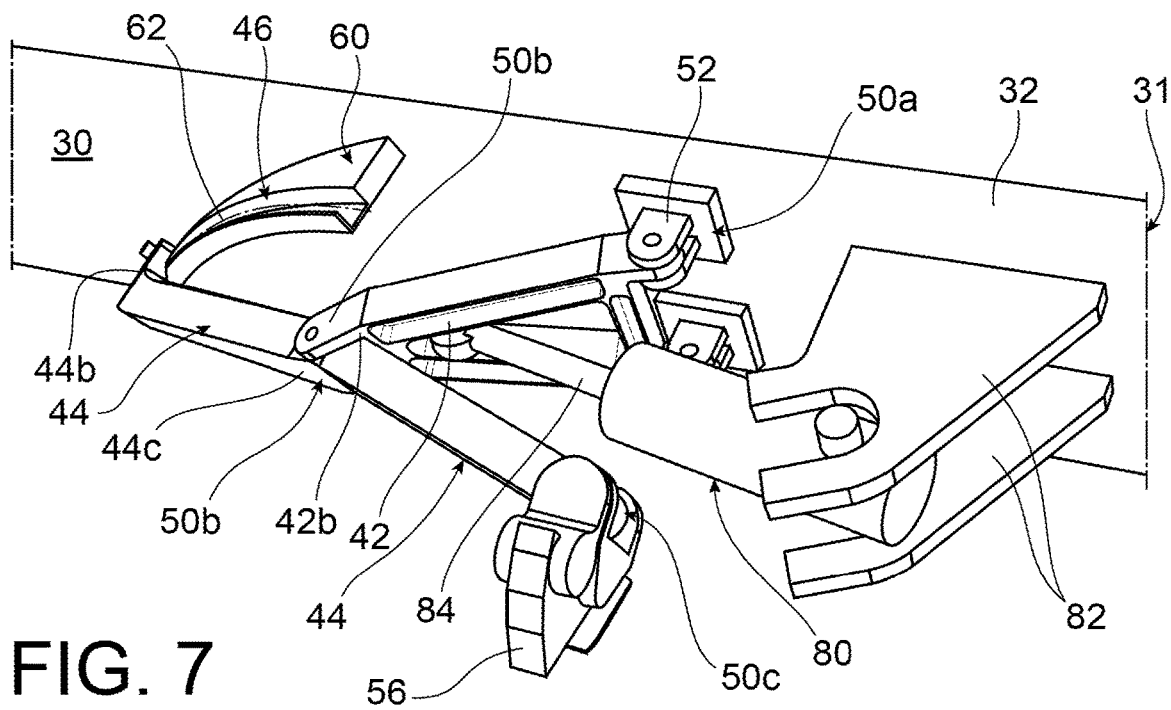
FIGS. 7 to 9 show the progression of the guiding device when actuating the moving device.
Figure 8:
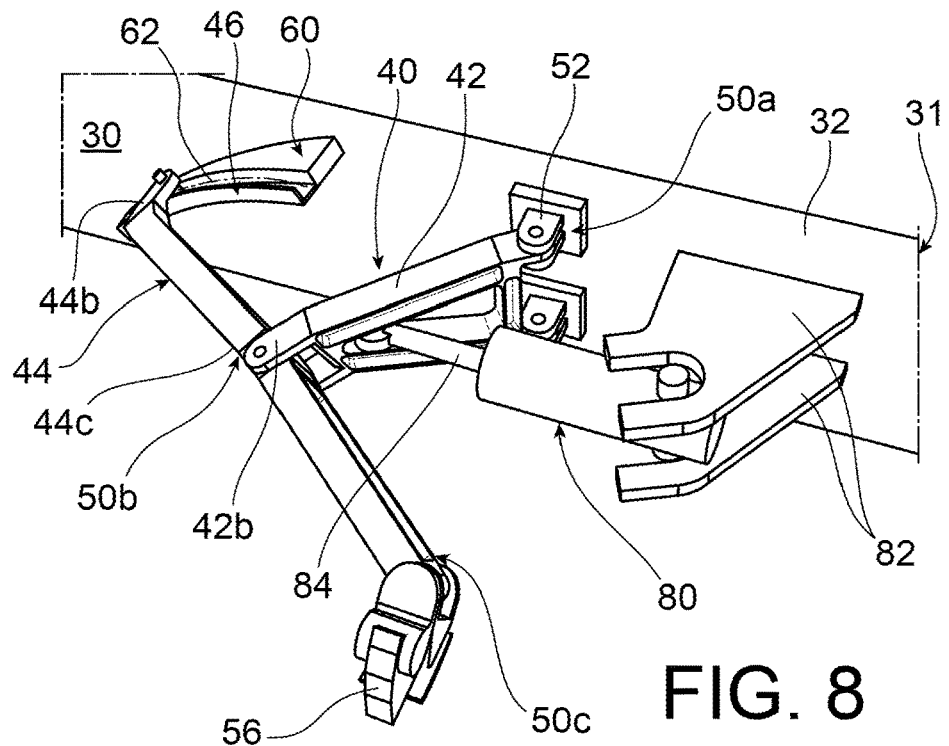
Figure 9:
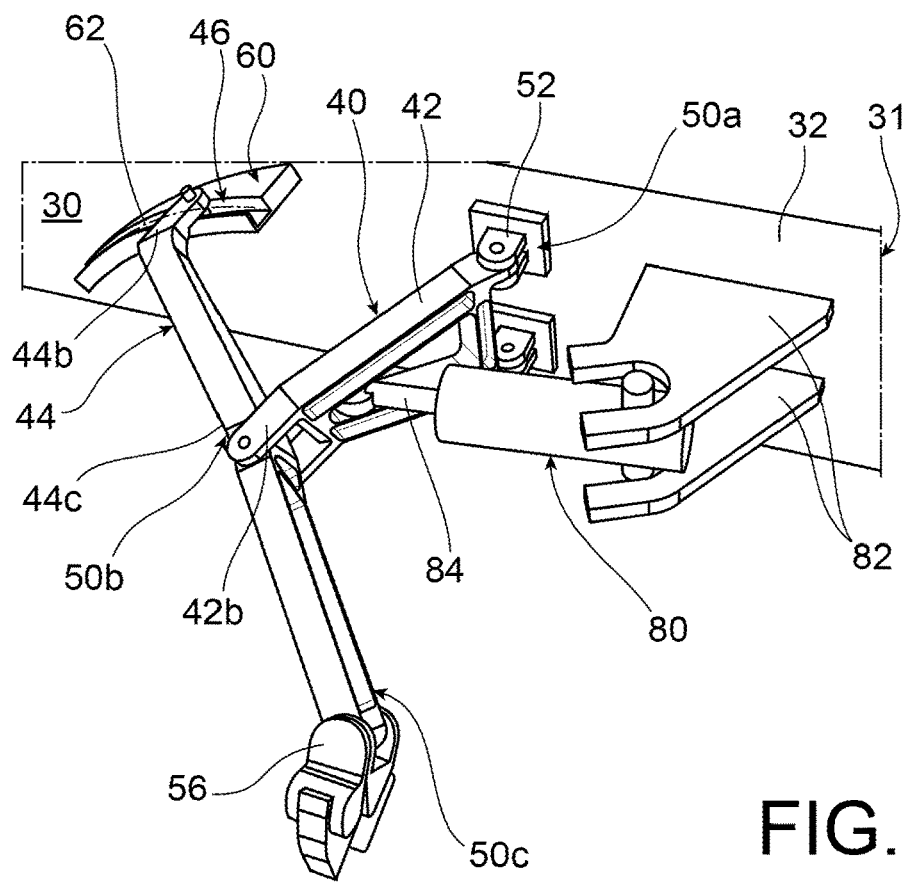
Figure 10:
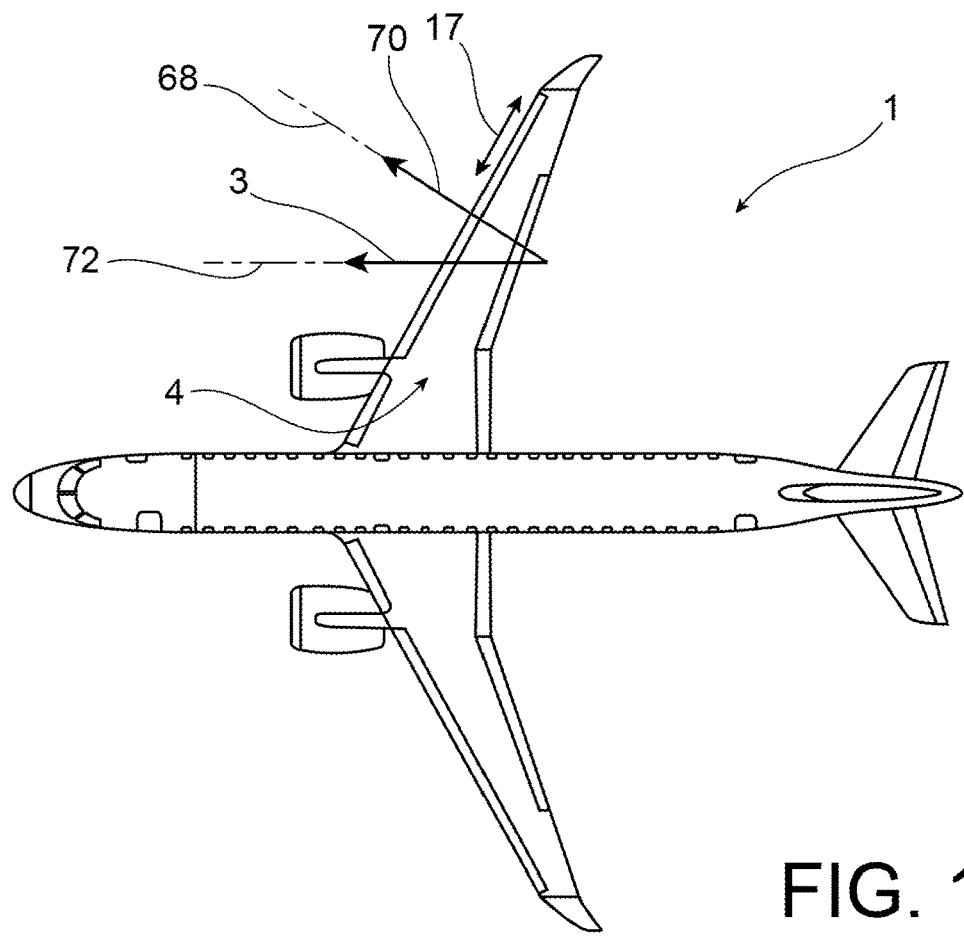
FIG. 10 schematically represents the different directions along which the mobile flap can be moved.

The trajectory 62 of the guiding rail 46 makes it possible for example to dictate, to the third hinged connection 50c, the connecting module 56 and to the whole flap 16, a movement along an arc of circle trajectory lying in a movement plane 68 depicted in FIG. 10, parallel to the chord direction 70. This movement plane 68 is thereby orthogonal to the span direction 17, and preferably also orthogonal to the front spar of the wing box. In this respect, it is noted that the arc of circle trajectory 74 of the third hinged connection 50c has also been depicted in FIGS. 4 and 5, showing the guiding device 40 in two different states when extending the flap. In these figures, it can in particular be seen that the roller 58 moves in the guiding rail 46 when the flap extends. This makes it possible to dictate the arc of circle trajectory to the third hinged connection 50c, which, in this embodiment, compares to an outlet element of the guiding device 40, connected to the connecting module 56.

As previously discussed, other motions of the mobile flap are also possible with the present invention. The trajectory 62 of the guiding rail 46 can also dictate a movement of the third hinged connection 50c in a movement plane 72 depicted in FIG. 10, parallel to the flight direction 3. This movement of the third hinged connection 50c is then preferentially an arc of circle trajectory lying in the plane 72, along a rotational axis (not represented) passing through the point of convergence 66 and substantially orthogonal to the flight direction 3. This solution is preferentially chosen when the whole flap is to be moved in parallel to the flight direction 3. In this respect, it is noted that in the latter case, and possibly for still different movements of the flap, the connecting module can be fitted with one or more additional degrees of freedom, essentially for the purpose of limiting the risks of the flap being jammed during its movement. These are preferably rotational degrees of freedom, provided between several distinct parts of this connecting module 56.

Finally, it is noted that in addition to enabling the flap 16 to be rotatably guided with respect to the fixed main body 8, the device 40 also enables this flap to be supported, and the aerodynamic loads undergone by the latter to be transmitted to the front spar 32 of the wing box 31.

With reference now to FIGS. 6 to 9, a preferred embodiment in which a device 80 for moving the flap cooperates with the guiding device 40 is shown. It is preferably a cylinder hingedly mounted at one of its ends to the front spar 32, through one or more fittings 82 integral with the same spar. At its opposite end, corresponding to the cylinder outlet rod 84, the latter is hingedly mounted to the first pivoting arm 42, in proximity to its second end 42b. Both hinging axes of the cylinder 80 are preferably parallel to each other, and also preferably parallel to the first hinging axis 54a of the first hinged connection 50a. Still to optimise the functionalities of the wing box 31, the cylinder 80 is totally located at the front of the front spar 32, by remaining restricted in the front end space 30 of the fixed centre body 8 when the flap assumes its retracted position.

It is noted that both devices 40, 80 here form an assembly enabling the mobile flap 16 to be supported, guided, and moved with respect to the wing fixed centre body 8. One or more of these assemblies, preferably with an identical design, can be associated with a same mobile flap 16, by being spaced from each other along the span direction 17. In this particular case of a movement of the flap 16 along a direction orthogonal to the chord direction 70, the rotational axes associated with each of the assemblies are the same. Alternatively, for other movement types of the flap, for example parallel to the flight direction 3, the rotational axes defined by each of the assemblies are not necessarily the same, but can be for example parallel to each other. In this same example of a movement of the flap parallel to the flight direction, the aforementioned rotational axes are then preferentially orthogonal to the flight direction.

Figure 11:
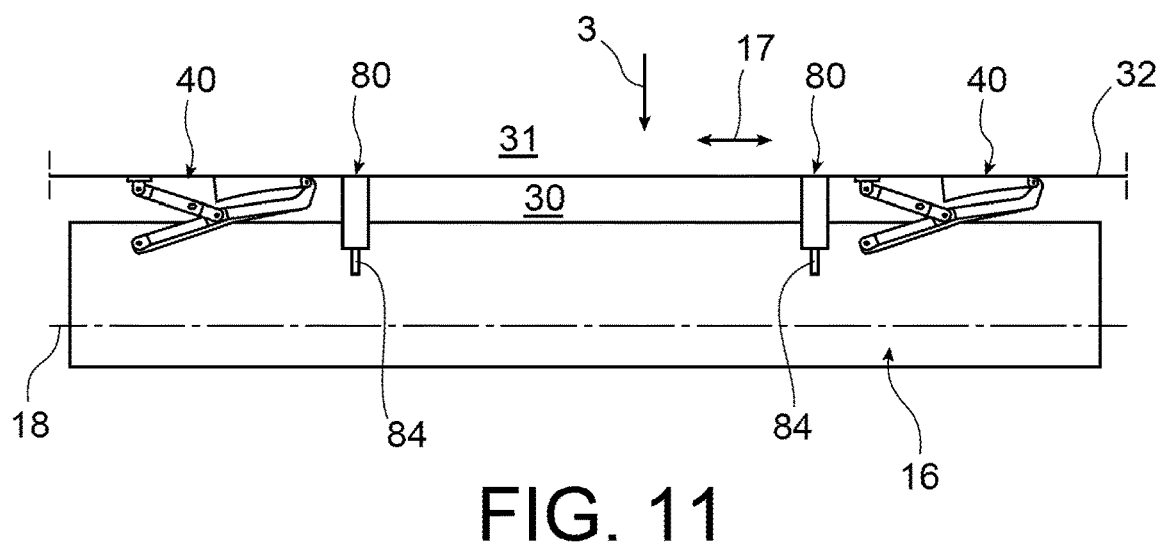
FIG. 11 is a schematic view of an alternative embodiment, in which the device for guiding the flap is independent of its moving device.

According to an alternative embodiment shown in FIG. 11, the guiding devices 40 and the moving devices 80 are independent. In other words, the moving devices 80, here also preferably as cylinders, no longer cooperate with the guiding devices 40 but have an outlet rod 84 directly mounted to the mobile flap 16. In this alternative, hinging the cylinder 80 on the front spar 32 and on the flap 16 is made through hinging axes which are preferentially parallel to the rotational axis 18 of this flap. For example, two moving devices 80, as well as two guiding devices 40 are provided, each arranged near one of the devices 80 along the span direction 17.

Of course various modifications can be brought by those skilled in the art to the invention just described, purely by way of non-limiting examples.

What is claimed is:

1. An aircraft wing (4) comprising a fixed wing centre body (8), as well as at least one mobile leading edge flap (16) for being moved relative to said fixed centre body between an extended position and a retracted position, the fixed wing centre body (8) comprising a front spar (32) delimiting a wing box (31) at the front of which said mobile flap is located, the latter being associated with at least one guiding device (40) for guiding it with respect to the fixed wing centre body (8),
    wherein the guiding device (40) is totally arranged at the front of the front spar (32) of the wing box, this device including the following elements:
        a first pivoting member (42) having a first end (42*a*) connected to the front spar (32) of the wing box through a first hinged connection (50*a*);
        a second pivoting member (44) connected to a second end (42*b*) of the first pivoting member (42) through a second hinged connection (50*b*) arranged between a first and a second end (44*a*, 44*b*) of the second pivoting member, the first end (44*a*) of this second pivoting member being connected to a module (56) for connecting the mobile flap (16) through a third hinged connection (50*c*); and
        a guiding rail (46) integral with the front spar (32) of the wing box, the guiding rail receiving a follower member (58) arranged at the second end (44*b*) of the second pivoting member (44), the guiding rail defining a trajectory (62) lying on the surface of a dummy sphere (64),
    and wherein the hinging axes (54, 54*b*, 54*c*) of the three hinged connections converge to a same point (66) corresponding to the centre of the dummy sphere (64).

2. The wing according to claim 1, wherein the first and second pivoting members (42, 44) are arms.

3. The wing according to claim 1, wherein the second hinged connection (50*b*) is arranged at a median zone (44*c*) of the second pivoting member (44).

4. The wing according to claim 1, wherein the first hinged connection (50*a*) is made using one or more hinges (52).

5. The wing according to claim 1, wherein the follower member (58) is a roller system carried by the second end (44*b*) of the second pivoting member (44).

6. The wing according to claim 1, wherein the guiding rail (46) and the first hinged connection (50*c*) are spaced apart from each other along a span direction (17) of the wing.

7. The wing according to claim 1, wherein the trajectory (62) defined by the guiding rail (46) requires a movement of the third hinged connection (50*c*) in a movement plane (68) parallel to a chord direction (70) of the wing, and wherein the motion of the flap relative to the wing fixed centre body is a rotation along a rotational axis (18) of the flap passing through the point of convergence (66) of the hinging axes (54, 54*b*, 54*c*) of the three hinged connections.

8. The wing according to claim 1, wherein the trajectory (62) defined by the guiding rail (46) requires a movement of the third hinged connection (50*c*) in a movement plane (72) parallel to a flight direction (3).

9. The wing according to claim 1, further including, being associated with said mobile leading edge flap (16), at least one device (80) for moving the mobile flap, the moving device being mounted to the wing fixed centre body (8).

10. The wing according to claim 9, wherein the moving device (80) has an outlet (84) mounted to the mobile leading edge flap (16), or has an outlet (84) mounted to the first pivoting member (42), or to the second pivoting member (44) of the guiding device (40).

11. The wing according to claim 9, wherein the moving device (80) is a cylinder.

12. The wing according to claim 9, wherein the moving device (80) is totally arranged at the front of the front spar (32) of the wing box (31).

13. The wing according to claim 9, wherein it includes being associated with said mobile leading edge flap (16), several moving devices (80) as well as several guiding devices (40).

14. The wing according to claim 12, wherein the moving device (80) is fastened to the front spar (32).

* * * * *